(12) United States Patent
Wirtz et al.

(10) Patent No.: US 6,877,398 B2
(45) Date of Patent: Apr. 12, 2005

(54) PISTON-ROD ASSEMBLY

(75) Inventors: Walter Wirtz, Gevelsberg (DE);
Marcello Di Fina, Bochum (DE);
Klaus Hofmann, Gevelsberg (DE);
Günter Poetsch, Schwelm (DE);
Walter Krenkel, Renningen (DE);
Ralph Renz, Sindelfingen (DE)

(73) Assignee: Krupp Bilstein GmbH, Ennepetal (DE)

( * ) Notice: Subject to any disclaimer, the term of this patent is extended or adjusted under 35 U.S.C. 154(b) by 147 days.

(21) Appl. No.: 10/222,027

(22) Filed: Aug. 14, 2002

(65) Prior Publication Data
US 2004/0031351 A1 Feb. 19, 2004

(30) Foreign Application Priority Data

Aug. 10, 2001 (DE) .......................................... 101 38 322

(51) Int. Cl.⁷ ................................................. G05G 1/21
(52) U.S. Cl. ..................... 74/579 R; 29/517; 29/888.09
(58) Field of Search .......................... 74/579 R, 579 E, 74/579 F, 580–594; 28/517, 888.09

(56) References Cited

U.S. PATENT DOCUMENTS

| | | | | |
|---|---|---|---|---|
| 4,350,056 A | * | 9/1982 | Ban et al. .................. | 74/579 E |
| 4,671,336 A | * | 6/1987 | Anahara et al. ............ | 164/110 |
| 4,703,076 A | * | 10/1987 | Mori ........................... | 524/420 |
| 5,076,866 A | * | 12/1991 | Koike et al. ................ | 148/437 |
| 5,363,821 A | * | 11/1994 | Rao et al. .................. | 123/193.2 |
| 5,488,084 A | * | 1/1996 | Kadoi et al. ................ | 524/423 |
| 6,487,931 B1 | * | 12/2002 | Hara et al. ................. | 74/579 R |

* cited by examiner

Primary Examiner—Chong H. Kim
(74) Attorney, Agent, or Firm—Max Fogiel

(57) ABSTRACT

A piston-rod assembly with a piston rod having at least one attachment at one end. The piston rod is fabricated of fiber reinforced composite. The piston rod has a body of fiber-reinforced ceramic with a basic matrix of carbon fibers or ceramic fibers or both wherein at least silicon carbide is embedded and with an open porosity, at least at the surface layer, of no more than 3% of the volume of that layer admitting lubricants into the pores. The at least one attachment (2, 18a, 19, or 22) includes at least one component of a non-ceramic material that fits into and/or interlocks with the piston rod.

27 Claims, 5 Drawing Sheets

PISTON-ROD ASSEMBLY

Figure 1:
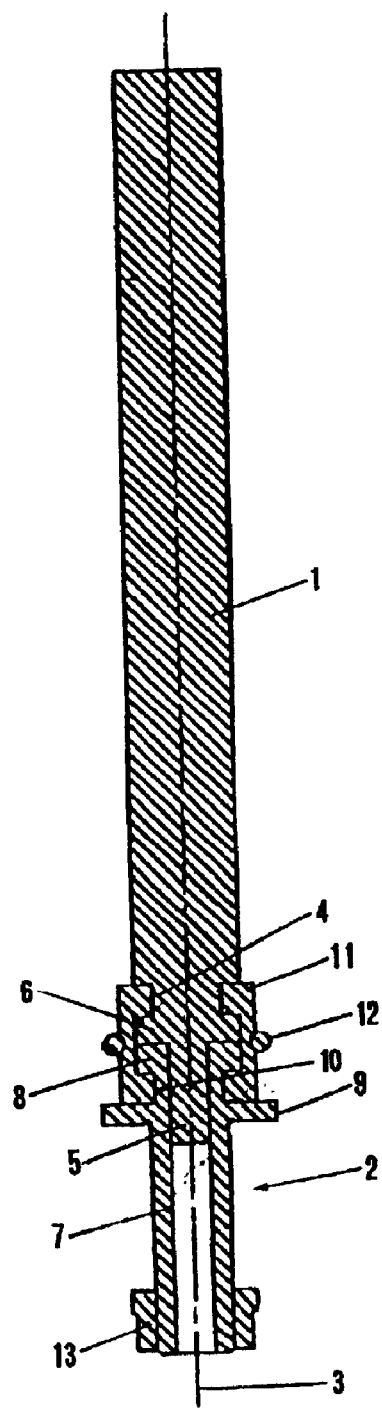

The present invention concerns a piston-rod assembly with a piston rod having at least one attachment at one end, whereby the piston rod is fabricated of fiber reinforced composite.

Piston rods of this genus are known.

Piston rods are employed in various fields, especially in piston-and-cylinder mechanisms and dashpots.

Various demands are made of the piston-rod assemblies employed in dashpots, including light weight, high stability subject to the different stresses that occur, either satisfactory lubrication acceptance or wear resistance, and insensitivity to corrosion.

Most of the piston rods now employed, especially in dashpots, comprise a metal body that is as a rule either subjected to surface treatment or coated to improve resistance to corrosion and wear. To decrease weight and increase corrosion resistance, the rods can also be made of aluminum alloys. Rods of fiber-reinforced polymer are also known. Such materials will also decrease the overall weight of the dashpot and lessen the reaction forces involved.

With the aforesaid state of the art and with the aforsaid demands as a point of departure, the object of the present invention is a piston-rod assembly that is lighter in weight, exhibits the requisite high strengths, can be securely attached long-term, and features outstanding lubrication acceptance and low friction and wear.

This object is attained in accordance with the present invention in a piston-rod assembly with a piston rod having at least one attachment at one end, whereby the piston rod is fabricated of fiber reinforced composite, characterized in that the piston rod has a body of fiber reinforced ceramic with a basic matrix of carbon fibers or ceramic fibers or both wherein at least silicon carbide is embedded and with an open porosity, at least at the surface layer, of no more than 3% of the volume of that layer admitting lubricants into the pores, and in that the at least one attachment includes at least one component of a non ceramic material that fits into and/or interlocks with the piston rod.

Fiber-reinforced ceramics are outstanding for both low weight and resistance to wear. The basic matrix of carbon and/or ceramic fibers can be manipulated to ensure that the fibers will be oriented paralleling the various lines and components of force occurring in the piston rod. Both carbon fibers and ceramic fibers can be employed alone, carbon fibers being preferred when the objective is high strengths and low weight, and ceramic fibers when high wear resistance and low (<1%) porosity are desired. A combination of carbon fibers and ceramic fibers can be employed when both high strengths and high wear resistance are needed. Enclosing the fibers in silicon carbide will ensure a mechanically stable matrix and increase wear resistance. The silicon carbide is preferably created by introducing liquid silicon into the fiber matrix. Enough carbon must be available to allow the silicon to react with it. Although the carbon can be interspersed in its elemental form throughout the matrix, the structure can also be preliminarily saturated with a polymer followed by pyrolysis in order to provide enough cavities and capillaries to ensure the presence of the carbon.

To ensure that the piston rod will be satisfactorily lubricated and low enough in friction, the body or at least its surface layer can be provided with a maximal porosity of 3% of the volume of that layer. The pores can also be preferably distributed throughout the body. A maximal porosity of 3% at the surface layer will prevent the establishment of high friction levels when lubricating oil or low-viscosity lubricants are introduced into the pores. The pore density should, however, be at least 0.5% to ensure at least minimal lubrication due to absorption of lubricants into the pores.

Finally, the present piston-rod assembly is outstanding in that the piston rod can be attached at one end by way of an appropriately dimensioned attachment constituting at least one component of non-ceramic material, preferably a metal or plastic component, fitting into and/or interlocking with the piston rod. This approach eliminates any need for the attachment to intervene in the body itself. The attachment, rather, will constitute an intermediate component designed to comply with all the specifications for attaching a piston rod without modification of the rod itself.

The porosity can be distributed uniformly throughout the body. This form of distribution can be resorted to when thorough lubrication is necessary and when relatively considerable leakage can be tolerated on the part for example of dashpot oil when the piston-rod assembly is employed in a dashpot. The porosity can on the other hand gradually increase outward from within the body when only small amounts of dashpot oil are exploited for lubrication or when low-viscosity greases are to be embedded in the outer layer.

Although the maximal porosity by volume in the vicinity of the surface should be 3%, this percentage should actually be limited to 1% in that low pore density will decrease the leakage of dashpot oil for example. Furthermore, it is precisely this low pore density that is appropriate for piston-rod assemblies subjected to high rates of stress, avoiding any additional leakage due to the pores' more powerful capillary action.

The content of silicon carbide in the body will preferably range from 25 to 60% by weight, whereby a range of 40 to 40 [sic] is even more preferable. The content of silicon carbide can dictate resistance to wear, high levels of carbide resulting in high resistance and rigidity and low levels in high strengths.

To ensure both high wear resistance and high strengths, the content of ceramic should increase gradually from inside out (resulting in a load-accommodating body and a wear-resistant frictional surface).

As previously mentioned herein, the orientation of the fibers can affect the strength of the piston rod along the various lines of force that occur. Basically, approximately 50% of the fibers in the matrix should parallel the rod's axis and 50% its circumference.

Another preferred orientation for the fibers is along a spiral around the axis of the piston rod. In this event, the fibers should spiral at an angle of between 30° and 60° and in particular of 45° to each other. Such an orientation will improve the tension-rupture behavior along the axis of the rod.

The body in at least another advantageous embodiment can be compacted with a polymer. A polymer resin, a phenolic resin for instance, is an appropriate material. Low-viscosity fats can also be forced into the pores to provide compaction. This further treatment will decrease any unacceptably extensive manufacturing dictated open porosity, of more than 3% in terms of the volume of the surface layer, that is, and pressure loss and oil or air leaks, depending on the particular application, can be decreased or extensively eliminated.

When high heat resistance is necessary, at least the core of the body can be compacted with metal or a metal alloy. Such compacting can be produced by melting the metal or alloy and forcing or infiltrating it into the pores. Metal or alloy compacting can also be resorted to when aging would exclude the use of a polymer.

Another means of attaining both high strengths and adequate wear resistance is to fabricate the body in the form of a tube of carbon fibers with a metal bar inserted into it. The advantage of metal bars is that their strengths and tension rupture behavior are higher than those of fiber-ceramic piston rods.

The body can alternatively be fabricated in the form of a carbon-fiber tube with a core bar of carbon-fiber reinforced plastic inserted into it. Such a structure can weigh definitely less than one with a metal bar.

A simple but effective means of fastening the piston rod to the attachment, preferably metal or plastic, is to secure the attachment to the piston rod with grooves or ridges or both. In this approach, the attachment will be in the form of at least two bowl-shaped parts that engage at least an annular groove in the piston rod. The parts can be fit over the rod and locked onto it by for example sliding a tensioning ring over them.

Another means of forcing or locking the parts into position is a bayonet mount. In this approach, the attachment can be one piece.

The attachment can be titanium, a titanium alloy, high-strength steel, or a steel alloy. The advantage of titanium or a titanium alloy is its low density and satisfactory corrosion resistance, whereas steel and steel alloys can be employed when such less expensive alternatives are acceptable.

A threaded section of the piston rod can constitute still another form of fastening. Such a threaded section can be employed either to secure a conventional attachment eye or to attach the piston rod directly to its mate. The threading can either be cut directly into the body or, when the piston rod comprises a sleeve and a core bar, into the bar.

Various methods of manufacturing fiber ceramic piston rods that can be employed in the piston-rod assemblies previously described herein and illustrated in the drawing will now be specified by way of examples.

EXAMPLE 1

A green carbon-fiber and ceramic (CFC) compact in the form of a rod was produced from a rolled-up phenolic-resin prepreg. The starting material was felted matting with fiber orientations of 0° and 90°. Some of the fibers accordingly paralleled the axis of the piston rod and the others extended around it. The components were high-tenacity (HT) fibers with a filament count of 3000 and impregnated with phenolic resin (supplied already impregnated by Akzo, Wuppertal under the designation "HTA"). The piece was 150 mm long and 15 mm in diameter.

The resulting compact was heat-treated in a furnace for 4 hours at 185° C. and then pyrolysed to 1650° C. The pyrolysed fabricate was then infiltrated with liquid silicon at temperatures above 1420° C. (the melting point of silicon) with a holding time at $T_{max}$=1650° C. for 1 hour. Finally, the blank was machined to its requisite final dimensions with diamond faced grinding bits.

The final fiber-ceramic piston rod exhibited the following properties:

| | |
|---|---|
| SiC content: | 30% by weight of the overall rod |
| Density: | 1.85 g/cm$^3$ |
| Open porosity: | 3% distributed uniformly over the rod's total cross-section |
| Fiber orientation: | 50% axial and 50% circumferential |

EXAMPLE 2

A green CFC compact in the form of a rod was fabricated from HTA-fiber rovings with a filament count of 3000 (obtained from Akzo) and a highly aromatic polymer resin. The piece was heat-treated for 8 hours at 240° C. The resulting porous fabricate was infiltrated with liquid silicon at temperatures above 1420° C. (the melting point of silicon) with a holding time at Tmax=1650° C. for 1 hour. The blank was then machine to its final dimensions.

The final fiber-ceramic piston rod exhibited the following properties:

SiC content: 25% by weight of the overall rod as against the 30% in Example 1

Density: 1.80 g/cm$^3$,the fibers spiraling around the rod's axis and the carbon fibers at a mutual angle of 45°.

Open porosity: 2% distributed uniformly over the rod's total cross-section, the lower figure deriving from the higher yield of carbon obtained by pyrolysing polymer resin as opposed to phenolic.

EXAMPLE 3

Another fiber-ceramic piston rod was produced as specified in Examples 1 and 2, although the infiltration of silicon was followed by further compacting with a highly aromatic polymer to decrease the open porosity (3% and 2%). Specifically, the silicon-infiltrated and cooled piece was further compacted with the aforesaid resin by resin-transfer molding.

The further compacting decreased the open porosity to 0.5% as compared to that in Examples 1 (3%) and 2 (2%). The pores were uniformly distributed throughout the piston rod.

In summary, the aforesaid examples demonstrate that porosities can be modified and established as prescribed at 0.5% to 3% of the overall volume. Piston rods of lower densities are accordingly possible, and an attachment appropriate for ceramics can be established.

Figure 2:
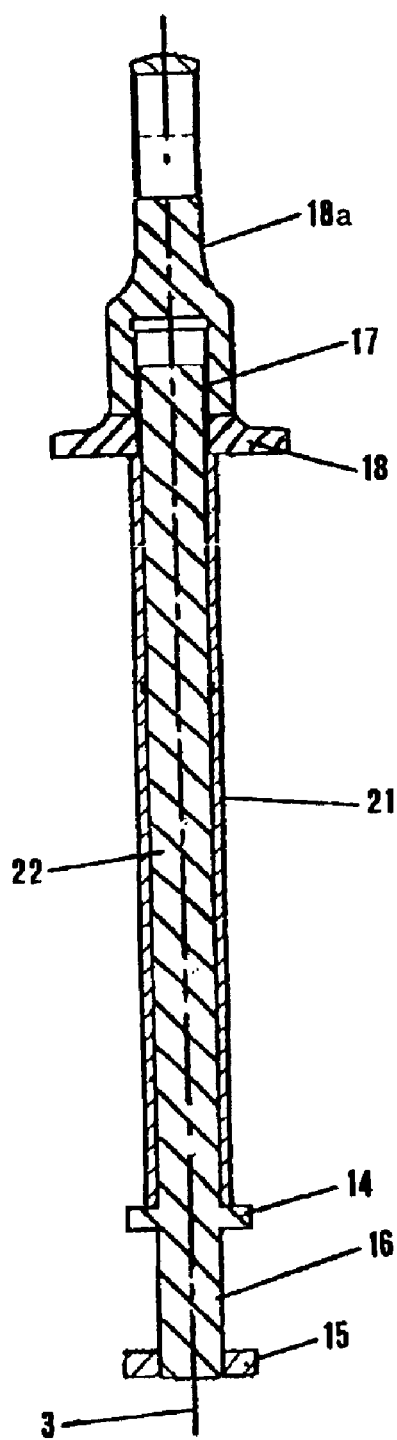
Figure 3:
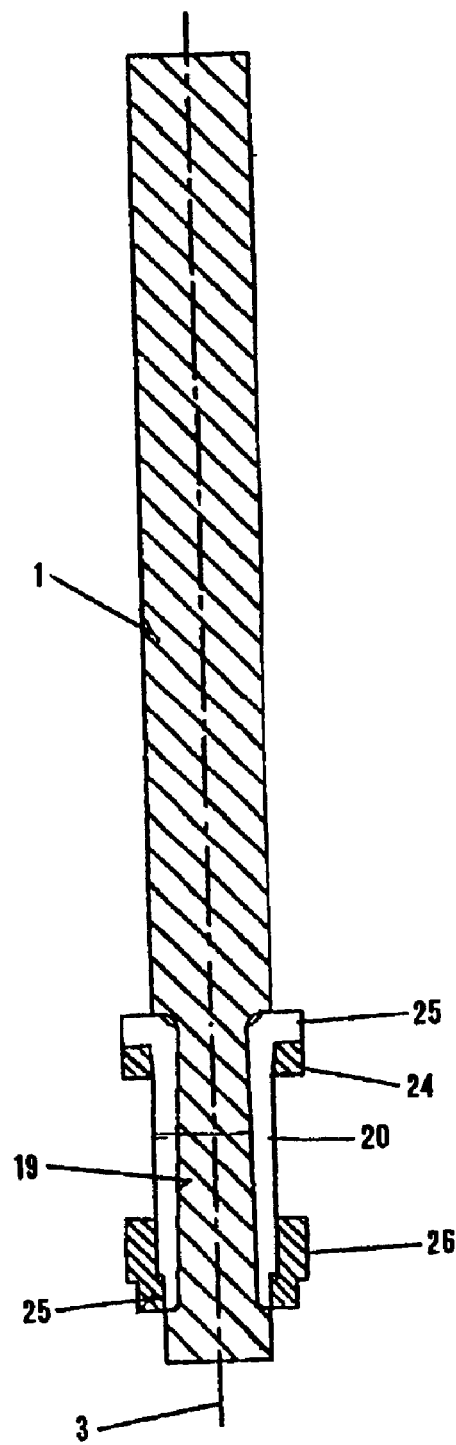
Figure 4:
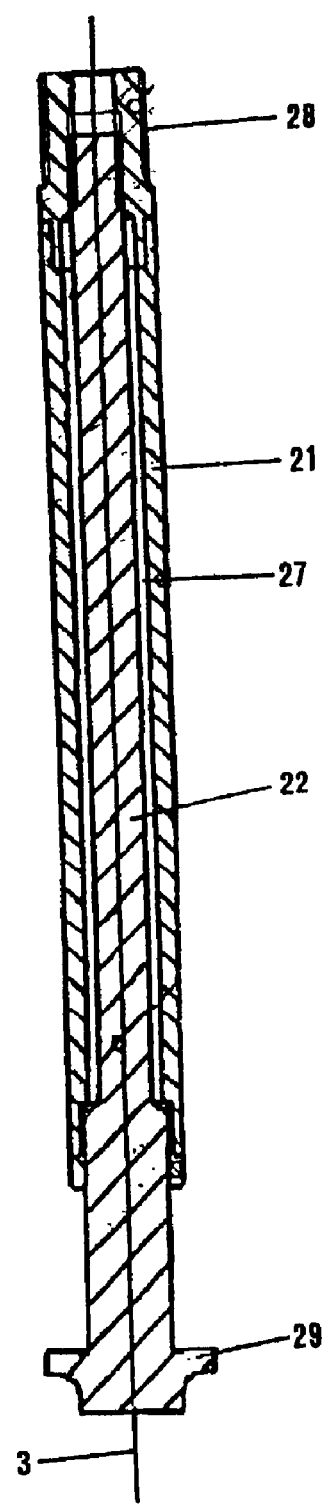
Figure 5:
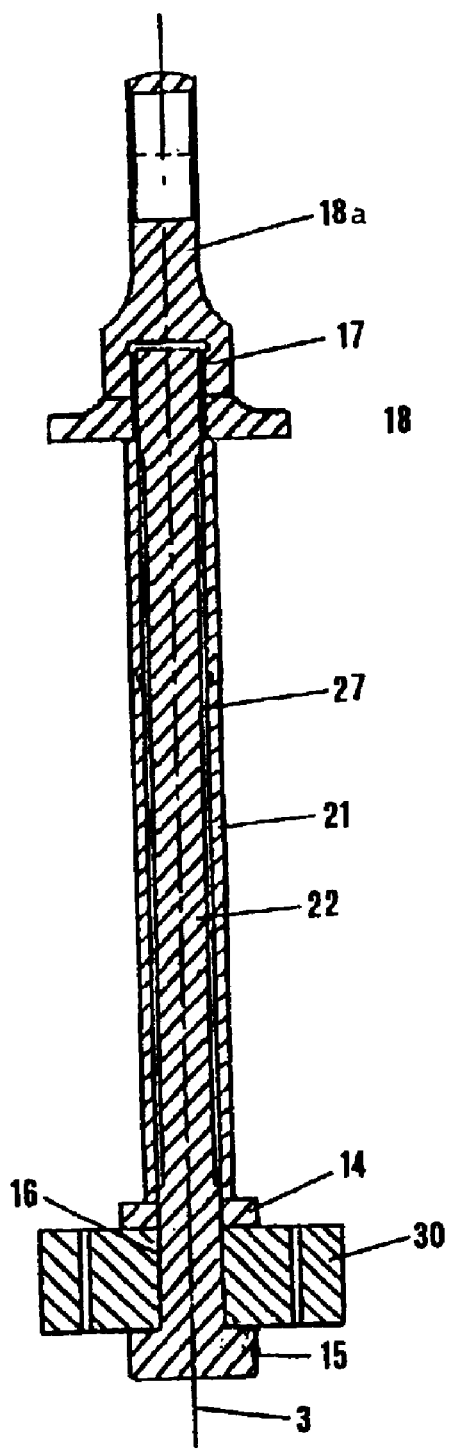

Embodiments of the present invention will now be specified by way of example in conjunction with their particular advantages with reference to the accompanying drawing, wherein FIG. 1 is a section along the axis of one embodiment of a piston-rod assembly with a piston rod and its attachment, FIG. 2 is a section along another embodiment of a piston-rod assembly, FIG. 3 depicts a third embodiment of a piston-rod assembly, similar to that in FIG. 1 but with a different means of attachment, FIG. 4 depicts a fourth embodiment of a piston-rod assembly with an attachment in the form of a bar inserted in the piston rod, and FIG. 5 depicts a fifth embodiment of a piston-rod assembly, similar to the one depicted in FIG. 2 but with a piston rod that differs in its interior structure.

The first embodiment of the piston-rod assembly, depicted in FIG. 1, comprises a piston rod 1 with an attachment 2 secured to one end. The rod is round in cross-section and includes an axis 3.

Since the piston rods 1 depicted in FIGS. 1 through 5 can basically be produced by the methods specified in the foregoing Examples 1 through 3, the details of their manufacture will not be further addressed hereinafter.

Piston rod 1 is of fiber-reinforced ceramic. It can be attached to a dashpot piston by way of attachment 2, which is fit into and interlocked with it by a segmented sleeve 11. The attachment end is for this purpose surrounded by an annular groove 4 and provided with a pin-or-arbor shaped projection 5 separated from the groove by a radially outwardly elevated flange 6. Attachment 2 is in the form of a sleeve-shaped piston bolt 7, the inside diameter of its sleeve section equalling the outside diameter of projection 5. The lower end of the sleeve section is provided with a flange 8. Another annular groove 10 is accordingly left between flange 8 and another flange section 9. Grooves 4 and 10 are occupied by the inwardly bent edges of sleeve 11, which is divided into two equal segments along the plane of projection of FIG. 1. Two-part sleeve 11 accordingly forces piston bolt 7 against piston rod 1, and the segments are secured in position by a surrounding tensioning ring 12. As will also be apparent from FIG. 1, piston bolt 7 is provided with an outside thread, over which a nut 13 is screwed. The individual components of attachment 2, specifically piston bolt 7, two-part sleeve 11, and nut 13, can be of titanium for instance, which provides the particular advantages of low density and high corrosion resistance.

An attachment like attachment 2 can provide a cost-beneficial and effective means of attaching a dashpot piston to piston rod 1.

Components of the embodiments hereinafter specified that are similar to and perform the same functions as those illustrated in FIG. 1 will be labeled with the same reference numbers, and any remarks applicable to one embodiment can generally be considered applicable to the others.

FIG. 2 depicts another embodiment with a body in the form of a hollow piston rod 21 of carbon-fiber reinforced silicon carbide (C/C SiC) with a bar 22 inserted into it. The lower end, as viewed in FIG. 2, of bar 22 is provided with a flange 14 and a screwed-on nut 15, leaving an annular groove 16 between them. A dashpot piston fits into and interlocks with groove 16. The upper end of bar 22 is provided with a thread 17 with a castellated nut 18 screwed onto it and resting against the face of piston rod 21. An eye 18a is also screwed down against castellated nut 18, providing a means of articulating attachment 2 to the suspension of a vehicle.

The third embodiment, depicted in FIG. 3, is essentially similar to the one depicted in FIG. 1 except that the annular groove 20 is in the immediate vicinity of the piston's attachment to piston rod 1. A two-part fastening sleeve 19, represented in the figure's plane of projection, is inserted into groove 20. From the section it will be evident that piston rod 1 tapers outward toward its free end in the vicinity of the groove in order to axially secure the position of fastening sleeve 19. Sleeve 19 is forced into annular groove 20 by a shrunken-on ring 24, of titanium for example, at the top, where the sleeve is provided with a radially outward flange 23. The other end of fastening sleeve 19, the lower end in the figure, is provided with a thread 25, over which a cap 26 is screwed.

The fourth embodiment, illustrated in FIG. 4, is similar to the embodiment illustrated in FIG. 2 in that it is provided with a bar 22 accommodated in a hollow piston rod 21. The bar 22 in the embodiment illustrated in FIG. 4, however, fits against the inner surface of the rod only at the top and bottom, leaving a cylindrical gap 27 at the middle. The advantage of this embodiment is that piston rod 21 requires very little extra machining, at the ends, to fit it to the bar and the bar to it. The upper end of the fastening sleeve 19 is here as well provided with an outside thread 28 that accommodates a castellated nut 18 for example and an attachment eye 18a similar to those illustrated in FIG. 2. The lower end of hollow piston rod 1 extends beyond the bar and is provided with a terminating flange 29, leaving an annular groove between the rod and the flange. A dashpot piston can be secured in this groove.

The fifth embodiment of the present invention, illustrated in FIG. 5, is similar to the embodiment illustrated in FIG. 2 except that it is provided with a cylindrical gap 27 like the one in the embodiment illustrated in and specified with reference to FIG. 4. The advantages are the same. FIG. 5 also depicts how the piece can be attached to a schematically depicted dashpot piston 30.

What is claimed is:

1. A piston rod assembly with a piston rod having at least one attachment at one end, said piston rod is being fabricated of fiber-reinforced composite, and being a body of fiber-reinforced ceramic with a basic matrix of carbon fibers or ceramic fibers or both, at least silicon carbide is being embedded with an open porosity, at least at the surface layer, of no more than 3% of the volume of that said layer admitting lubricants into the pores, said at least one attachment including at least one component of a non-ceramic material fitting into and/or interlocking with the piston rod.

2. A piston rod as defined in claim 1, wherein said porosity is distributed throughout the volume of the body and maximally constitutes 3% of that said volume.

3. A piston rod as defined in claim 2, wherein said porosity is distributed uniformly throughout the volume of the body.

4. A piston rod as defined in claim 2, wherein said porosity increases gradually from the inside out.

5. A piston rod as defined in claim 1, wherein said maximal porosity is 1%0.6. Piston rod as in claim 1, characterized in that the content of silicon carbide in the body is 25% to 60% by weight.

6. A piston rod as defined in claim 1, wherein the content of silicon carbide in the body is 25% to 60% by weight.

7. A piston rod as defined in claim 6, wherein the ceramic content increases gradually from inside out.

8. A piston rod as defined in claim 1, wherein said silicon carbide is produced by liquid infiltration of silicon into the a matrix of carbon fibers and/or ceramic fibers, providing free carbon.

9. A piston rod as defined in claim 8, wherein approximately 50% of the fibers in the matrix are oriented paralleling the axis thereof and approximately 50% paralleling the circumference thereof.

10. A piston rod as defined in claim 8, wherein the carbon fibers in the matrix are oriented in a spiral around the axis of the piston rod.

11. A piston rod as defined in claim 10, wherein the spiraling carbon fibers are at an angle of 30° to 60° to each other.

12. A piston rod as defined in claim 1, wherein the body or at least its core is compacted with a polymer.

13. A piston rod as defined in claim 1, wherein the body or at least its core is compacted with metal or with a metal alloy.

14. A piston rod as defined in claim 1, wherein the body is a hollow cylinder of carbon fibers with a core in the form of a bar inserted into it said hollow cylinder.

15. A piston rod as defined in claim 14, wherein said bar is of metal or of a metal alloy.

16. A piston rod as defined in claim 14, wherein said bar is of carbon-fiber reinforced plastic.

17. A piston rod as defined in claim 1, wherein said at least one attachment is secured against grooves or elevations in or on the piston rod.

18. A piston rod as defined in claim 1, wherein the attachment is fastened by a bayonet mount.

19. A piston rod as defined in claim 17, wherein the attachment (14) is divided into at least two segments, the end of the piston rod having at least one annular groove (20) that some surfaces of the segments fit into.

20. A piston rod as defined in claim 1, wherein the attachment is of titanium, a titanium alloy, high-strength steel, or a steel alloy.

21. A piston rod as defined in claim 19, wherein said at least two segments are secured in position by at least one ring resting against their outer surface.

22. A piston rod as defined in claim 1, wherein low viscosity fats are embedded in at least the pores in its outer layer.

23. A piston rod as defined in claim 1, wherein dashpot oil is embedded in at least the pores in its outer layer.

24. A piston rod as defined in claim 1, including another attachment in the form of a threaded section (28) at the other end of the rod.

25. A piston rod as defined in claim 24, wherein said threaded section is machined out of the body.

26. A piston rod as defined in claim 24, wherein said threaded section is machined out of the bar.

27. A piston rod as defined in claim 1, wherein the attachment is metal or plastic.

* * * * *